United States Patent
Christen

(10) Patent No.: US 11,802,008 B2
(45) Date of Patent: Oct. 31, 2023

(54) CROSS-CONVEYOR SORTER WITH CLEARING APPARATUS, AND METHOD FOR REMOVING ITEMS MISPLACED ON A CROSS-CONVEYOR SORTER

(71) Applicant: Hansueli Christen, Zeihen (CH)

(72) Inventor: Hansueli Christen, Zeihen (CH)

( * ) Notice: Subject to any disclaimer, the term of this patent is extended or adjusted under 35 U.S.C. 154(b) by 0 days.

(21) Appl. No.: 17/415,210

(22) PCT Filed: Dec. 18, 2019

(86) PCT No.: PCT/IB2019/061040
§ 371 (c)(1),
(2) Date: Jun. 17, 2021

(87) PCT Pub. No.: WO2020/128917
PCT Pub. Date: Jun. 25, 2020

(65) Prior Publication Data
US 2022/0063928 A1     Mar. 3, 2022

(30) Foreign Application Priority Data

Dec. 21, 2018    (DE) .......................... 102018009974.2

(51) Int. Cl.
*B65G 47/52*       (2006.01)
*B65G 17/34*       (2006.01)
*B65G 47/96*       (2006.01)

(52) U.S. Cl.
CPC ......... *B65G 47/525* (2013.01); *B65G 17/345* (2013.01); *B65G 47/962* (2013.01); *B65G 2203/0208* (2013.01); *B65G 2203/042* (2013.01)

(58) Field of Classification Search
CPC ... B65G 47/525; B65G 47/962; B65G 17/345
See application file for complete search history.

(56) References Cited

U.S. PATENT DOCUMENTS

| | | | | |
|---|---|---|---|---|
| 4,369,873 | A | * | 1/1983 | Heuft ...................... B07C 5/367 |
| | | | | 198/367 |
| 5,489,017 | A | | 2/1996 | Bonnet |
| 10,668,506 | B2 | * | 6/2020 | Erden .................... B65G 47/96 |

(Continued)

FOREIGN PATENT DOCUMENTS

| | | |
|---|---|---|
| DE | 69511586 T2 | 12/1999 |
| DE | 69606663 T2 | 7/2000 |
| DE | 69706059 T2 | 11/2001 |

(Continued)

*Primary Examiner* — William R Harp
(74) *Attorney, Agent, or Firm* — Hudak, Shunk & Farine Co. LPA

(57) ABSTRACT

A cross-conveyor sorter with a clearing apparatus for removing misplaced items (Sd) is described, wherein the cross-conveyor sorter has a plurality of carriages which are connected to one another on an endless conveying track, the carriages are provided with a cross-conveyor device, which is oriented transversely to the transportation direction (x) and on which the items (Sp) can be transported and unloaded at predetermined unloading locations. The cross-conveyor sorter clearing apparatus enables the risk-free removal of misplaced items (Sd) during operation. The clearing apparatus is a blow-off device which is arranged on a first side alongside the conveying track.

19 Claims, 4 Drawing Sheets

(56) References Cited

U.S. PATENT DOCUMENTS

2009/0272624 A1   11/2009   Edwards et al.

FOREIGN PATENT DOCUMENTS

| DE | 20305788 U1 | 8/2003 |
| DE | 60303478 T2 | 8/2006 |
| DE | 102007040859 A1 | 3/2009 |
| DE | 102014206016 A1 | 10/2015 |
| EP | 0029614 A1 | 6/1981 |
| EP | 0761545 A2 | 3/1997 |
| EP | 3566982 A1 | 11/2019 |

* cited by examiner

CROSS-CONVEYOR SORTER WITH CLEARING APPARATUS, AND METHOD FOR REMOVING ITEMS MISPLACED ON A CROSS-CONVEYOR SORTER

FIELD OF THE INVENTION

The invention relates to a cross-conveyor sorter with a clearing apparatus for removing misplaced items wherein the cross-conveyor sorter has a plurality of carriages which are connected to one another on an endless conveying track, the carriages are provided with a cross-conveyor device, which is oriented transversely to the transportation direction and on which the items can be transported and unloaded at predetermined unloading locations as well as a corresponding method for this.

BACKGROUND OF THE INVENTION

A cross-conveyor sorter can in particular be a cross-belt sorter or a tilt-tray sorter. A cross-belt sorter is described, for example, in DE 10 2007 040 859 A1 and represents a conveyor system for items, the cross-conveyor device of which comprises several short belt conveyors attached perpendicular to the conveying direction and being mounted on a carriage. Several carriages are connected to one another in an articulated manner and the resulting endless train is driven in a form-fitting, frictional-locking manner or by a linear motor. The items are picked up and discharged by moving the belt conveyor during inward and outward transfer.

In principle, the tilt-tray sorter is comparable to the cross-belt sorter, as it also consists of individual carriages that are located on a self-contained, roller-guided track course. The cross-conveying device, however, comprises a tiltable tray on the individual carriages instead of a transverse belt, which is initially in a horizontal position and, when the intended unloading location is reached, discharges the item by tilting.

During operation it happens again and again that items get on or between the carriage or carriages and are not discharged by the cross-conveyor device in this position.

An attempt can then be made to discard this misplaced item by operating the cross-conveyor device arranged on the two adjacent carriages.

After several unsuccessful attempts, the carriage concerned, or consequently both adjacent carriages, is blocked for further distribution of items and is/are then no longer available. During a day shift, up to a few hundred items can be stored out of place, which initially results in a significant loss in performance of the cross-conveyor sorter. In a maintenance shift, misplaced items must then be removed manually from the cross-conveyor sorter, since this is not possible on the cross-conveyor sorter moving at a speed of 2.5 m/s for reasons of occupational safety. This activity can only be carried out during a maintenance shift with a cross-conveyor sorter running at maintenance speed of approx. 0.2 m/s and is therefore very time-consuming.

Mechanical solutions for removing misplaced items during operation have so far not been able to establish themselves, since manufacturers of cross-conveyor sorters and the operators of these systems fear that mechanical devices for clearing the misplaced items will jam in the cross-conveyor sorter, could damage it considerably and shut down the cross-conveyor sorter over a longer period of time.

SUMMARY OF THE INVENTION

The invention was therefore based on the object of providing a cross-conveyor sorter whose clearing apparatus enables the risk-free removal of misplaced items during operation. Another object was to develop a corresponding process for operating the cross-conveyor sorter with the clearing apparatus.

The object is achieved according to the invention with a cross-conveyor sorter with a clearing apparatus for removing misplaced items ($S_d$), wherein the cross-conveyor sorter has a plurality of carriages which are connected to one another on an endless conveying track, the carriages are provided with a cross-conveyor device, which is oriented transversely to the transportation direction (x) and on which the items ($S_p$) can be transported and unloaded at predetermined unloading locations, and wherein the clearing apparatus is a blow-off device which is arranged on a first side alongside the conveying track. The blow-off device enables misplaced items to be removed during operation, so that the number of occupied or incorrectly identified carriages is minimized and all of the carriages in circulation are available for distributing items.

Due to their position directly next to the conveying track and the carriages guided on it, power is transmitted to the misplaced items to be removed exclusively by means of the air-flow released by the blow-off device, so that even temporarily no collision-endangering components need to be brought to or between the carriages. The air-flow emitted by the blow-off device must be dimensioned with regard to its volume flow and its flow speed in such a way that a frictional connection of the misplaced items is overcome.

The misplaced items can in particular be deposited on a carriage component of the carriage and the blow-off device can have at least one air outlet opening which is arranged in a stationary manner on or above a vertical level of the carriage component. The carriages with their cross-conveyor devices arranged thereon thus move past the stationary blow-off device and the air outlet opening(s) arranged in a stationary manner on the blow-off device. The main advantage of this arrangement is based on the fact that, in particular when the moving air stream is fed in, no moving parts need to be tracked.

The cross-conveyor sorter is preferably a cross-belt sorter, the carriage component of which is a cover apron that spans a distance between adjacent carriages. The cross-belt sorter has, as a cross-conveyor device, a conveyor belt running transversely to the transport direction of the cross-conveyor sorter. The cover apron is a flexible or flexibly attached component that permanently spans the distance between the carriages and allows relative movement between them. In addition, the cover apron has a strength that enables a misplaced item lying on it to be transported to the blow-off device. The at least one air outlet opening should be arranged in such a way that the air flow emitted therefrom brushes over the cover apron and entrains items that are out of place there.

For this purpose, in particular, an outflow of air from the air outlet opening(s) at the level of the cover apron parallel to this or from a position of the air outlet opening(s) above the cover apron at an inclined angle from above comes into consideration.

As an alternative to the design described above, the cross-conveyor sorter can also be a tilt-tray sorter. A tilt-tray sorter has, as a cross-conveyor device, a tilting tray that is movably mounted transversely to the transport direction of the cross-conveyor sorter. A chassis of the tilt-tray sorter, with which the carriage is supported on a conveying track, is mostly covered from above by means of a cover plate. The tilt-tray is held by a tilt-tray arm which protrudes upward with respect to the cover plate. A distance between adjacent carriages is bridged by means of a gaiter in order to prevent items from falling between the carriages.

In a tilt-tray sorter, the carriage component is usually the cover plate, which is arranged under a movably mounted tilt-tray and/or a chassis of the respective carriage and/or a gaiter that spans a distance between adjacent carriages. Large-height items that have remained lying on the cover plate often block a tilting movement of the tilt-tray during the unloading process. The same applies to items lying on the gaiters, which sometimes protrude into the movement space of the tilt-tray. General cargo stuck in the chassis could be destroyed or cause damage to the tilt-tray sorter by jamming. The at least one air outlet opening of the blow-off device should be arranged in such a way that the air flow released therefrom brushes over the cover plate and/or the chassis and/or the gaiters and carries away items that are lying there out of place.

A plurality of air outlet openings are expediently arranged one behind the other in the transport direction. Due to the relatively high transport speed of the cross-conveyor sorter in areas of over 2 m/s, the dwell time of the misplaced items in front of a single air outlet opening would under certain circumstances be too short for complete removal from the carriage component. This problem could also be solved, for example, by an air outlet opening moving along in the transport direction in sections or an air outlet opening in the form of a slot in the transport direction. The first-mentioned solution, however, requires a large number of moving parts both in the area of the air outlet opening and in the area of the air supply and the second-mentioned solution leads to a linear overflow of the cross-conveyor sorter, through which items lying correctly on their cross-conveyor could possibly be blown-off in an uncontrolled manner. In addition, with a slot-like air outlet opening, a relatively large amount of air would also have to be provided for blowing off the items.

According to a first advantageous embodiment, the multiple air outlet openings are activated at the same time. An activated air outlet opening is understood to mean the release of an air flow therefrom. When the misplaced items drive past the activated air outlet openings, the misplaced items repeatedly receives an impulse transversely to its transport direction from the air flow emerging from the closest air outlet opening, which results in a particularly effective lateral displacement of the misplaced item until it leaves the carriage component.

Alternatively, it is also possible for a single one of the plurality of air outlet openings to be activated one after the other in the transport direction. In this way, a misplaced item can be specifically blown and the necessary air volume can be reduced. It makes sense to activate the respective individual air outlet opening as a function of a conveying speed of the cross-conveyor sorter in the transport direction.

In this embodiment, the active air outlet opening changes to the adjacent air outlet opening within a time interval in which the misplaced item is transported at transport speed to the adjacent air outlet opening by means of the cross-conveyor sorter. The active air outlet opening runs with the misplaced item. The air outlet opening in the air outlet area of which the misplaced item is currently located is activated.

It has been found to be particularly advantageous if a collection table is arranged on a second side opposite the first side, next to the conveying track. The collection table serves as a shelf for the misplaced items blown-off by the blow-off device. The collection table can also be designed as a package chute or end point device and for this purpose have an inclined section which is used to transport the items away from the cross-conveyor sorter.

The collection table is preferably arranged on or below a vertical level of the carriage component, so that items blown off by the blow-off device reach the collection table in a barrier-free manner.

A second blow-off device is expediently arranged on a second side opposite the first side, next to the conveying track. This second blow-off device can then be offset from the blow-off device in the transport direction of the cross-conveyor sorter and is particularly advantageous in the case of tilt-tray sorters. It can happen with tilt-tray sorters that an item remains, for example, on the cover plate when the blow-off device is operated and retained by the tilt-tray arm. For example, after a further cycle, the second blow-off device can then trigger and blow from the opposite side against the item, which consequently slips off the cover plate. If a second blow-off device is used, a second collection table should also be arranged on the opposite side of the conveying track.

The blow-off device(s) can be connected to a blower or to a compressor. A blower is an externally driven fluid flow machine that usually conveys a gaseous dispersion medium, in this case air, by means of an impeller rotating in a housing and achieves a pressure ratio between 1 and 1.3 between the suction and pressure sides. Fluid flow machines that achieve a pressure ratio greater than 1.3 are called compressors. The choice of a blower or compressor depends in particular on the expected mass and the expected volume of the items to be distributed with the cross-conveyor sorter.

A sensor unit is advantageously arranged in the transport direction prior to the blow-off device in such a way that it identifies the distance between the adjacent carriages and a misplaced item located on the carriage component. In this way, the energetic efficiency can be further improved, since the blow-off device is only put into operation when an item lying on the carriage component has been detected by the sensor unit beforehand. In addition, a temporary start-up of the blow-off device initiated by the sensor unit reduces the risk of correctly placed items traveling past the blow-off device being blown-off as well.

The blow-off device(s) is/are advantageously arranged in the transport direction beyond the unloading locations. This arrangement helps to minimize the risk of accidentally blowing off items that are correctly positioned on the cross-conveyor device. If all unloading locations are placed prior to the blow-off device, the correctly placed items have already been dropped at the intended unloading location and no longer reach the blow-off device, so that in principle even the sensor unit can be dispensed with.

The inventive method is carried out using a cross-conveyor sorter having a plurality of carriages connected to one another on an endless conveying track, wherein the carriages are provided with a cross-conveyor device oriented transversely to the transportation direction. According to the method the items are first transported on the cross-conveyor and unloaded at predetermined unloading locations. Displaced items are blown-off according to the invention by means of a blow-off device.

Expediently, a distance between adjacent carriages and a misplaced item located on a cover apron or a gaiter are identified by means of a sensor unit. The distance between the carriages corresponds to the position of the cover apron or gaiter on which a misplaced item could lie.

If the sensor unit also detects the presence of an item in the same time interval, for example based on a measured loading height, it is concluded that the item is a misplaced item and the blow-off device is activated in a further process step.

If the blow-off device has a plurality of air outlet openings arranged one behind the other in the transport direction, that air outlet opening in front of which the misplaced item to be blown is located can always be selectively activated in a further process step.

BRIEF DESCRIPTION OF THE DRAWINGS

For a better understanding, the invention is explained below with reference to five figures showing in FIG. 1: a plan view of a cross-conveyor sorter as a cross-belt sorter with a blow-off device.

DETAILED DESCRIPTION OF THE INVENTION

Figure 1:
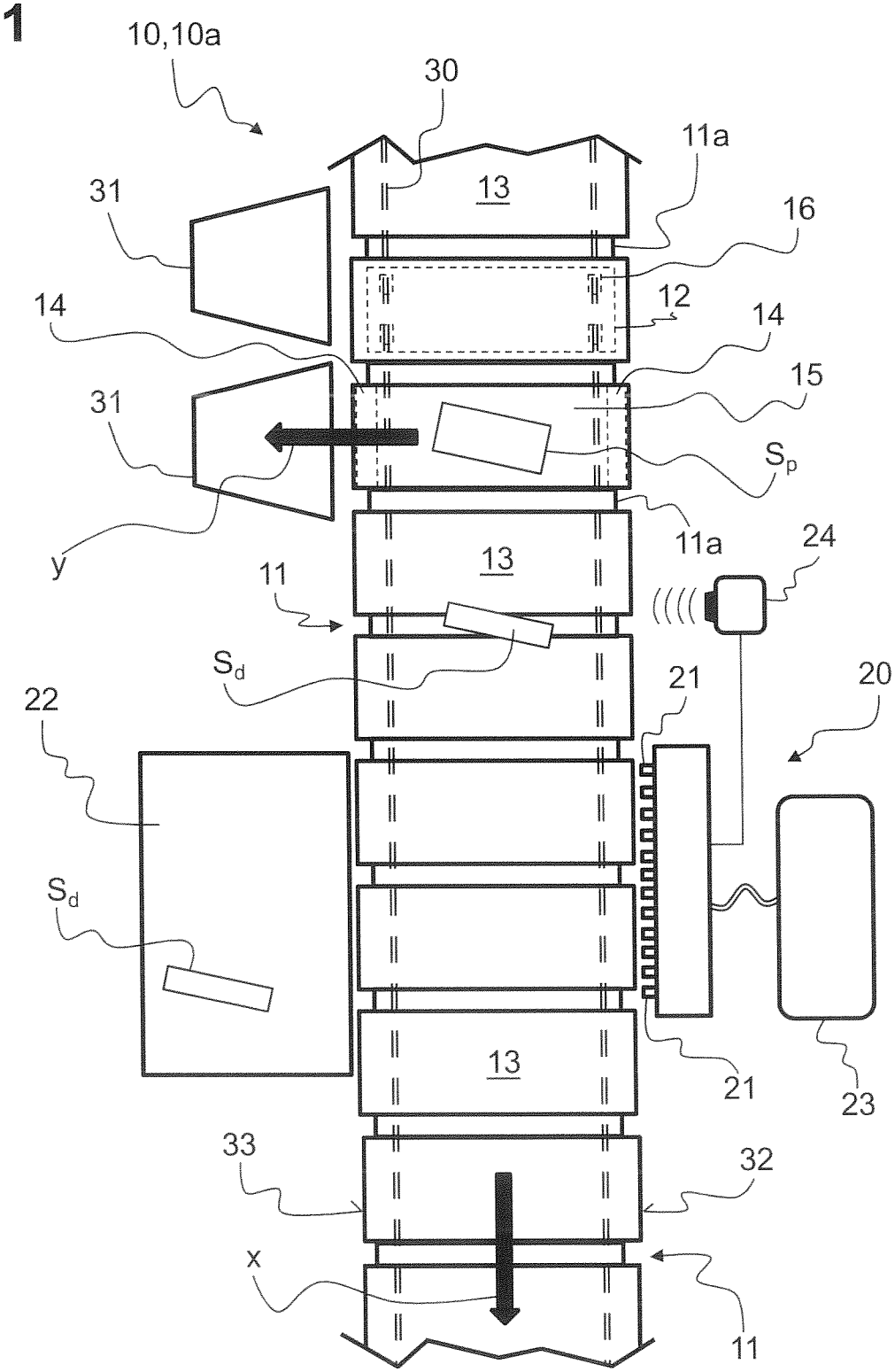

FIG. 1 shows a top view of a section of a cross-conveyor sorter 10 in the form of a cross-belt sorter 10a, the carriages 12 of which are mechanically coupled to one another to form a circulating chain and are positively guided on a conveying track 30. The mechanical connection between adjacent carriages 12 allows a relative movement of the involved carriages 12, especially when cornering. The carriages 12 each have wheels 16 which roll on the conveying track 30. When the cross-conveyor sorter 10 is running, all of the carriages 12 move synchronously in a transport direction x.

Each carriage 12 is provided with a cross-conveyor device 13 which, in the exemplary embodiment shown, has a conveyor belt 15 running over pulleys 14. During loading of the cross-conveyor sorter 10, correctly placed items $S_p$ arrive at the respective cross-conveyor device 13 and remain there until reaching an unloading location 31. As soon as this unloading location 31 is reached, the cross-conveyor device 13 is put into operation and the items $S_p$ correctly placed thereon are thrown off in the discharge direction y.

The discharge direction y is at right angles and in a plane to the transport direction x. In the case of error-free transferring and discharging, correctly placed items $S_p$ lie exclusively on the cross-conveyor device 13 of a carriage 12.

There is a distance d (see FIG. 2) between adjacent carriages 12 of the cross-belt sorter 10a or between the cross-conveyor devices 13 located thereon, which is necessary for relative movement of the carriages 12 to one another and is covered by a cover apron 11a. The cover apron 11a prevents misplaced items $S_d$ from getting between the cross-conveyor devices 13 of adjacent carriages 12 in the transport direction x, from falling between the carriages 12 or onto the conveying track 30 and being destroyed there. The cover apron 11a is a carriage component 11 of the cross-belt sorter 10a, on which typically misplaced items $S_d$ remain.

The misplaced item $S_d$ lying on the cover apron 11a often does not capture any of the cross-conveyor devices 13, neither those of the leading nor those of the trailing carriage 12, so that the misplaced item $S_d$ initially remains on the cover apron 11a and cannot be dropped at the intended unloading location 31 or any other unloading location 31. After several revolutions, the cross-conveyor sorter 10 would block the cross-conveyor device 13 located in front of and behind the misplaced item $S_d$ in the transport direction x, so that it would then no longer be available until the next maintenance shift.

Items $S_d$ misplaced on a cover apron 11a passes a sensor unit 24 which detects both the presence of the distance d in front of it between the carriages 12 and the presence of the item $S_d$ that is misplaced on the cover apron 11a. This avoids that an item $S_p$ possibly correctly placed on the cross-conveyor device 13 is removed by the blow-off device 20 described below.

The sensor unit 24 is connected to the blow-off device 20 arranged on a first side 32 next to the conveying track 30. In the embodiment according to FIG. 1, the sensor unit 24 is on the same first side 32 as the blow-off device 20. In the event of a misplaced item $S_d$, the sensor unit 24 puts the blow-off device 20 into operation, whereby an air flow emerges from one or more air outlet opening(s) 21 formed on the side of the blow-off device 20 facing the cross-conveyor sorter 10 blowing down the misplaced item $S_d$ from the cover apron 11a.

The blow-off device 20 is connected to a rearward blower apparatus or a compressor 23. Preferably the blower apparatus or compressor 23 maintains a permanent pressure gradient and the air outlet openings 21 are preferably controlled with electromechanical valves, so that even with a high-speed cross-conveyor sorter 10, the misplaced item $S_d$ to be blown-off is removed from the air outlet opening(s) 21 by providing an air flow without delay. In order to minimize the air volume flow necessary for blowing-off the misplaced item $S_d$, the several air outlet openings 21 emit an air flow one after the other in the transport direction x, alternating according to the speed of the cross-conveyor sorter 10. Therefore, only the air outlet opening 21 is active in the area of which—in the transport direction x—the misplaced item $S_d$ is currently located. Each of the air outlet openings 21 involved blows the misplaced item $S_d$ on in sections in the discharge direction y.

The misplaced item $S_d$, blown-off contactlessly from the cover apron 11a in this way, arrives at a collection table 22 which is stationary on a second side 33 next to the conveying track 30 and remains there until a manual removal, which can take place, depending on the occurrence of misplaced items $S_d$, even during the ongoing operation of the cross-conveyor sorter 10.

The collection table 22 is always located on the other side of the conveying track 30 in relation to the blow-off device 20, so that misplaced items $S_d$ are carried along by the blowing effect of the air flowing out of the air outlet openings 21 and transported away from the cross-conveyor device 13 in the direction of flow.

Figure 2:
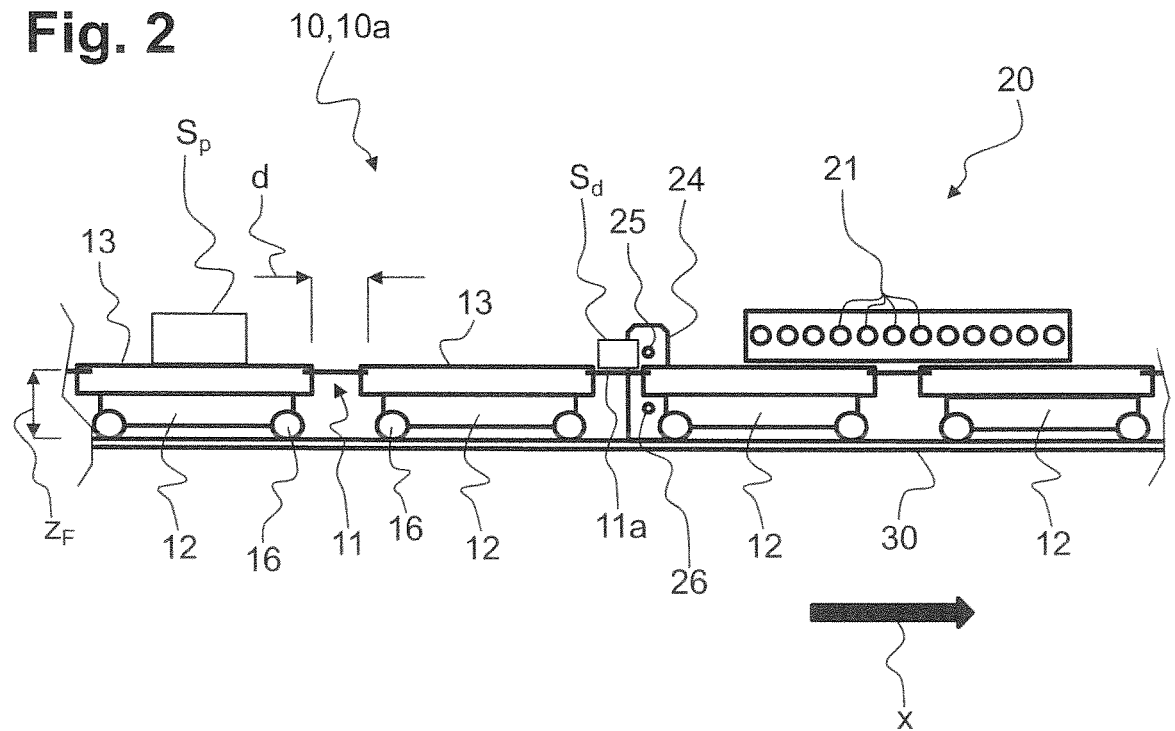
FIG. 2: a side view of the cross-belt sorter shown in FIG. 1 with a blow-off device.

FIG. 2 shows the blow-off device 20 arranged on the cross-conveyor sorter 10 in a side view, the carriages 12 with their respective cross-conveyor devices 13 traveling in transport direction x past the blow-off device 20, which is placed stationary next to the conveying track 30.

A correctly placed item $S_p$ could be unloaded before reaching the blow-off device 20 by means of the below located cross-conveyor device 13 at an unloading location 31 provided for this purpose but omitted for reasons of clarity. It would also be possible to arrange the unloading location 31 also in the transport direction x behind the blow-off device 20, since the blow-off device 20 only removes misplaced item $S_d$ lying on the cover apron 11a.

A misplaced item $S_d$ is identified by means of the sensor unit 24, which comprises an item sensor 25 and a carriage sensor 26. The item sensor 25 is used to qualitatively detect an item $S_p$, $S_d$. The carriage sensor 26 measures the distance d between two carriages 12. If, at the same point in time, the carriage sensor 26 detects a distance d and the item sensor 25 detects items $S_p$, $S_d$, it must be a misplaced item $S_d$ lying on the cover apron 11a. By emitting an air flow escaping from the air outlet openings 21, a contactless removal of the misplaced item $S_d$ from the cover apron 11a then takes place.

The item sensor 25 is arranged in the vertical direction above the carriage sensor 26 and is preferably located on or above a vertical level $z_F$ of the cover apron 11a.

The collection table 22 to be seen in FIG. 1 should be placed with its upper side on or below the vertical level $z_F$ of the cover apron 11a. As a result, the misplaced items $S_d$ blown down by the blow-off device 20 can slide barrier-free onto the collection table 22 and remain there.

Figure 3:
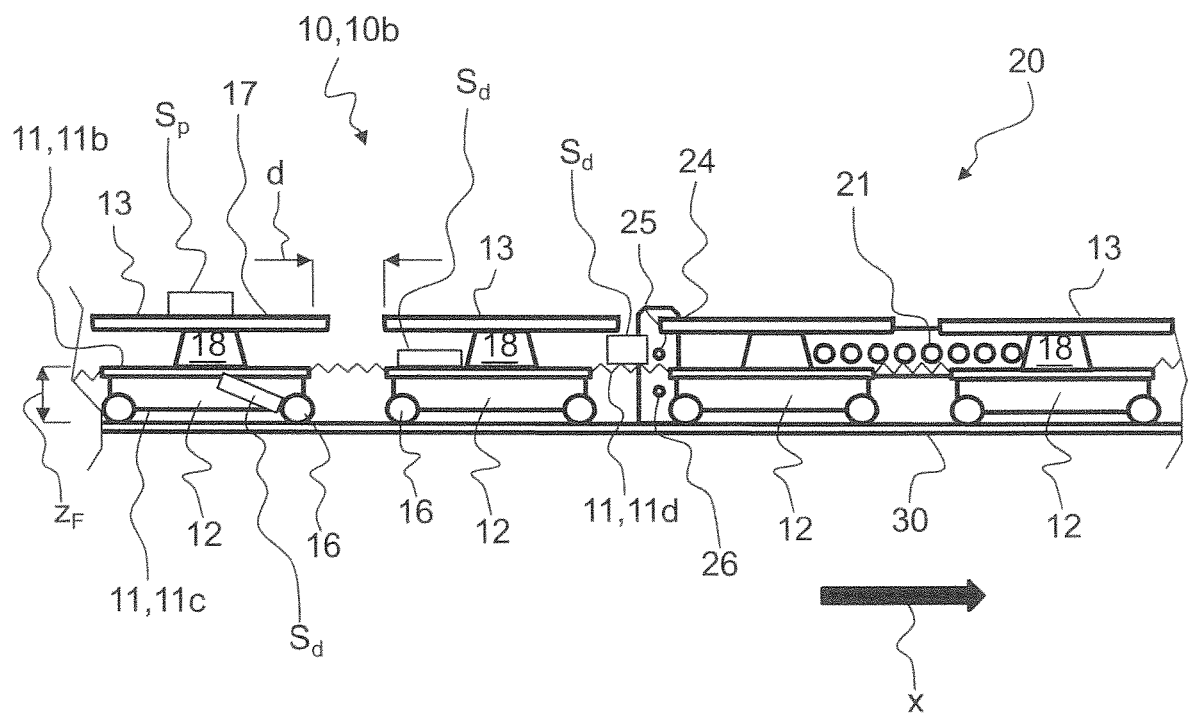
FIG. 3: a side view of a cross-conveyor sorter as a tilt-tray sorter with a blow-off device.
Figure 4:
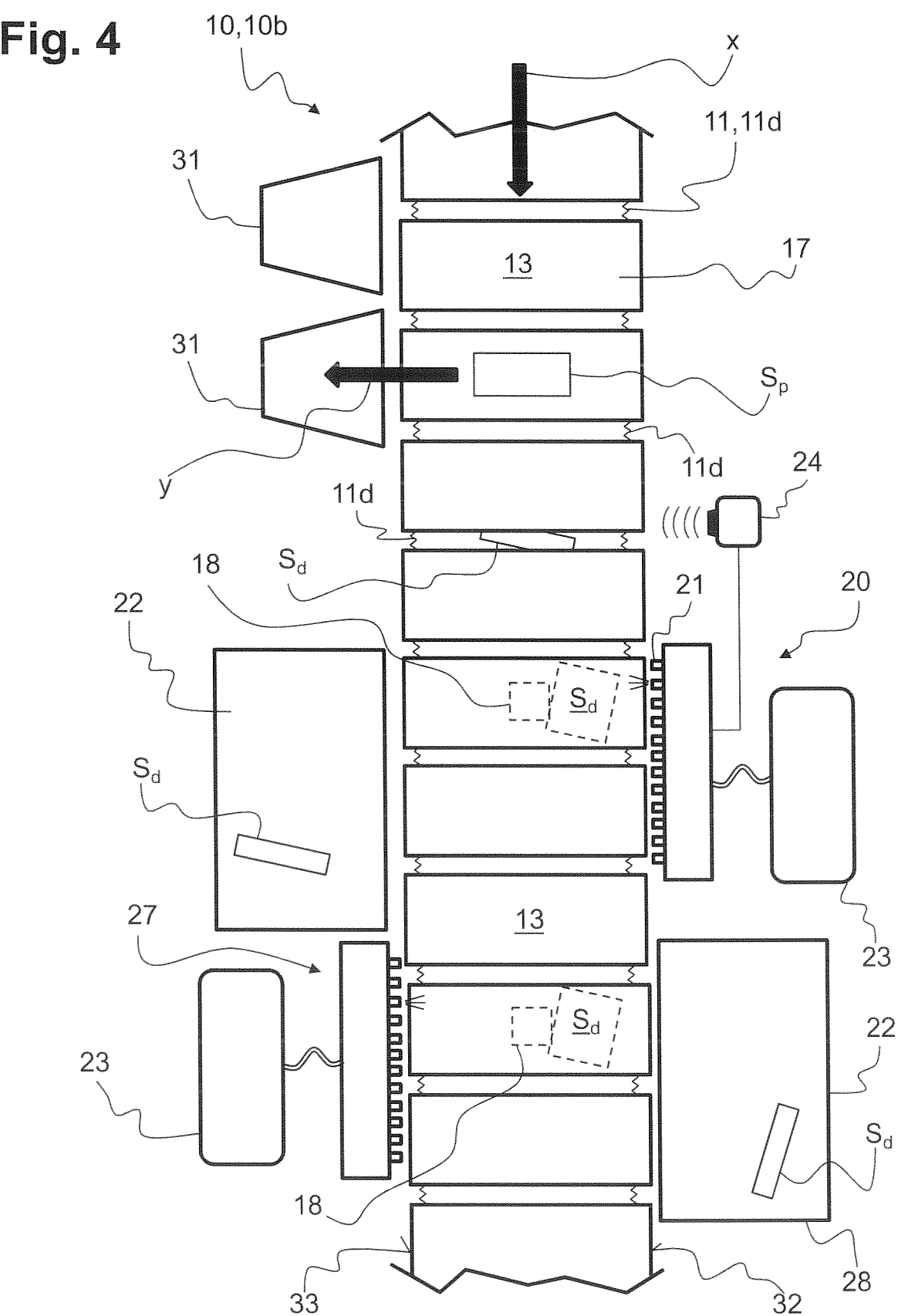
FIG. 4: a plan view of the tilt-tray sorter shown in FIG. 3 with opposing blow-off devices

FIGS. 3 and 4 show a cross-conveyor sorter 10 as a tilt-tray sorter 10b. Each carriage 12 has a chassis 11c with wheels 16 mounted on it, with the aid of which the carriage 12 is positively guided on a conveying track 30 in the transport direction x. The chassis 11c is spanned by a cover plate 11b, the cover plate 11b covering both the wheels 16 and parts of the chassis 11c, not shown, and thus mostly preventing misplaced items $S_d$ from penetrating below a level of the cover plate 11b.

Arranged on the cover plate 11b is an upwardly projecting tilt-tray arm 18, at the free end of which a tilt-tray 17 is pivotably attached. For unloading, the tilt-tray 17 pivots about a pivot axis aligned in the transport direction x, so that, by initiating a tilting movement, a correctly placed item $S_p$ located thereon slides off at the unloading location 31 provided for this purpose.

Despite the presence of the cover plate 11b, it happens again and again that misplaced items $S_d$ get into the chassis 11c, as is indicated in the carriage 12 on the far left in the plane of FIG. 3.

A gaiter 11d is provided between each of the carriages 12, bridging the distance d between the carriages 12 and at the same time allowing the carriages 12 to articulate to one another.

Displaced items $S_d$ can, for example, lie on the gaiter 11d and can no longer be removed when the tilt-tray 17 is actuated.

However, misplaced items $S_d$ lying on the cover plate 11b during operation are particularly problematic, since this often limits the function of the tilt-tray 17. In particular in the case of towering, misplaced items $S_d$, the bottom of the tilt-tray 17 hits the misplaced item $S_d$ and is thereby blocked in its movement.

The cover plate 11b, the chassis 11c and the gaiter 11d represent carriage components 11 of a tilt-tray sorter 10b, onto which frequently misplaced items $S_d$ end up. According to the invention, on the vertical level $z_F$ of these carriage components 11 there is a stationary blow-off device 20 standing next to the conveying track 30, the air outlet openings 21 of the blow-off device 20 emitting an air flow which blows-off any misplaced item $S_d$ lying in the area of action.

FIG. 4 illustrates a situation in which a misplaced item $S_d$ located on the cover plate 11b of the tilt-tray sorter 10b is blown by the blow-off device 20 arranged on the first side 32 of the conveying track 30, but not removed due to its operative contact with the tilt-tray arm 18. In the transport direction x beyond the blow-off device 20, a second blow-off device 27 is stationary placed on the second side 33, which blows any misplaced item $S_d$ remaining on the cover plate 11b and thereby moves the misplaced item $S_d$ towards the first side 32. To receive this misplaced item $S_d$, a second collection table 28 is also set up on the first side 32. The second blow-off device 27 and the second collection table 28 are constructed identically to the blow-off device 20 and the collection table 22.

Figure 5:
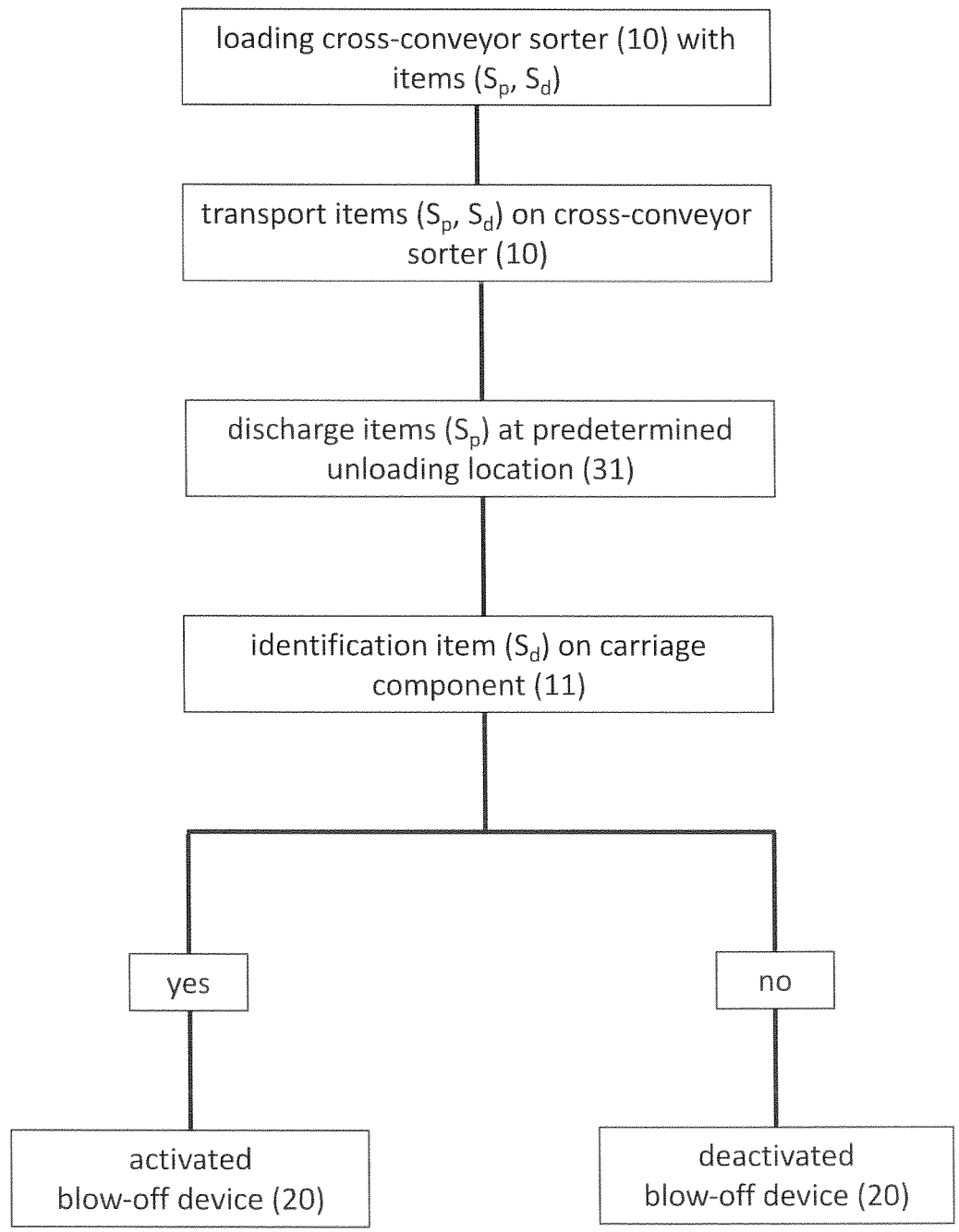
FIG. 5: a flow chart of the method according to the invention.

The process steps that run with the aid of the cross-conveyor sorter 10 and the blow-off device 20 according to an exemplary embodiment of the invention are listed in the flow chart shown in FIG. 5. In a first process step, the cross-conveyor sorter 10 is loaded with items $S_p$, $S_d$. It is irrelevant here whether the loading, as is usual with a cross-belt sorter 10a, takes place by means of the cross-conveyor sorter 10 itself and a pulling-in movement of the cross-conveyor device 13 located on it, or by means of a separate conveyor. In case of a tilt-tray sorter 10b, the tilt-trays 17 are typically loaded by means of a separate conveying means, not shown here.

In a second, optional process step, the items $S_p$, $S_d$ are transported on the cross-conveyor sorter 10 in the transport direction x. It is initially irrelevant whether an item $S_p$ is correctly deposited on the cross-conveyor device 13 or an item $S_d$ is out of place on a carriage component 11.

In a third process step, the items $S_p$ correctly placed on the cross-conveyor device 13 are discharged at the unloading location 31 provided for this purpose. Should it be a misplaced item $S_d$ which is not sufficiently grasped and discharged by the cross-conveyor device 13, it remains on the carriage component 11 and is driven past the intended unloading location 31 following the transport direction x.

In a fourth, optional process step, there is an identification of whether a misplaced item $S_d$ is present on a carriage component 11. This identification is carried out by the sensor unit 24 which, in the presence of a misplaced item $S_d$, puts the blow-off device 20 into operation in a fifth process step.

If the sensor unit 24 does not detect any misplaced item $S_d$, the blow-off device 20 remains in a deactivated state.

LIST OF REFERENCE NUMBERS 10 cross-conveyor sorter
10a cross-belt sorter
10b tilt-tray sorter
11 carriage component
11a cover apron
11b cover plate
11c chassis
11d gaiter
12 carriage
13 cross-conveyor device
14 pulley
15 conveyor belt
16 wheels carriage
17 tilt-tray
18 tilt-tray arm
20 clearing apparatus, blow-off device
21 air outlet opening
22 collection table
23 blower, compressor
24 sensor unit
25 item sensor
26 carriage sensor
27 second blow-off device
28 second collection table
30 conveying track
31 unloading location
32 first side conveying track
33 second side conveying track
d distance between carriages
$S_p$ item $S_d$ misplaced item
x transport direction
y discharge direction
$z_F$ level carriage component

What is claimed is:

1. A cross-conveyor sorter, comprising:
a clearing apparatus for removing misplaced items ($S_d$),
wherein the cross-conveyor sorter has a plurality of carriages which are connected to one another on an endless conveying track, the carriages are provided with a cross-conveyor device, which is oriented transversely to the transportation direction (x) and on which the items ($S_p$) can be transported and unloaded at predetermined unloading locations, and
wherein the clearing apparatus is a blow-off device which is arranged stationary on a first side alongside the conveying track.

2. The cross-conveyor sorter according to claim 1, wherein the misplaced item ($S_p$) is deposited on a carriage component of the carriage and the blow-off device has at least one stationary air outlet opening located on or above a vertical level ($z_F$) of the carriage component.

3. The cross-conveyor sorter according to claim 2, wherein the cross-conveyor sorter is a cross-belt sorter and the carriage component of which is a cover apron which spans a distance (d) between adjacent carriages.

4. The cross-conveyor sorter according to claim 2, wherein the cross-conveyor sorter is a tilt-tray sorter.

5. The cross-conveyor sorter according to claim 4, wherein the carriage component of the tilt-tray sorter is a cover plate which is arranged under a movably mounted tilt-tray and/or a chassis of the respective carriage and/or a gaiter which spans a distance (d) between adjacent carriages.

6. The cross-conveyor sorter according to claim 2, wherein the at least one air outlet opening is arranged in such a manner that air discharged therefrom flows over the carriage component.

7. The cross-conveyor sorter according to claim 2, wherein a plurality of air outlet openings are arranged one behind the other in the transport direction (x).

8. The cross-conveyor sorter according to claim 7, wherein the plurality of air outlet openings are activated simultaneously.

9. The cross-conveyor sorter according to claim 7, wherein a single one of the plurality of air outlet openings is activated one after the other in the transport direction (x).

10. The cross-conveyor sorter according to claim 9, wherein activation of the respective single air outlet opening is dependent on a conveying speed of the cross-conveyor sorter in the transport direction (x).

11. The cross-conveyor sorter according to claim 1, wherein a second blow-off device (27) is arranged next to the conveying track on a second side oppositely to the first side.

12. The cross-conveyor sorter according to claim 1, wherein the blow-off device(s) is/are connected to a blower or to a compressor.

13. A cross-conveyor sorter, comprising:
a clearing apparatus for removing misplaced items ($S_d$),
wherein the cross-conveyor sorter has a plurality of carriages which are connected to one another on an endless conveying track, the carriages are provided with a cross-conveyor device, which is oriented transversely to the transportation direction (x) and on which the items ($S_p$) can be transported and unloaded at predetermined unloading locations,
wherein the clearing apparatus is a blow-off device which is arranged on a first side alongside the conveying track, and
wherein a collection table is arranged next to the conveying track on a second side which is oppositely to the first side.

14. The cross-conveyor sorter according to claim 13, wherein the collection table is arranged on or below a vertical level ($z_F$) of the plurality of carriages.

15. A cross-conveyor sorter, comprising:
a clearing apparatus for removing misplaced items ($S_d$),
wherein the cross-conveyor sorter has a plurality of carriages which are connected to one another on an endless conveying track, the carriages are provided with a cross-conveyor device, which is oriented transversely to the transportation direction (x) and on which the items ($S_p$) can be transported and unloaded at predetermined unloading locations,
wherein the clearing apparatus is a blow-off device which is arranged on a first side alongside the conveying track, and
wherein in the transport direction (x) prior to the blow-off device, a sensor unit is arranged in such a manner that it identifies the distance (d) between the adjacent carriages and a misplaced item ($S_d$) located on one of the plurality of carriages.

16. A cross-conveyor sorter, comprising:
a clearing apparatus for removing misplaced items ($S_d$),
wherein the cross-conveyor sorter has a plurality of carriages which are connected to one another on an endless conveying track, the carriages are provided with a cross-conveyor device, which is oriented transversely to the transportation direction (x) and on which the items ($S_p$) can be transported and unloaded at predetermined unloading locations,
wherein the clearing apparatus is a blow-off device which is arranged on a first side alongside the conveying track, and
wherein the blow-off device is arranged in the transport direction (x) beyond the unloading locations.

17. A method for removing items ($S_d$) that have been misplaced on a cross-conveyor sorter, wherein the cross-conveyor sorter has a plurality of carriages connected to one another on an endless conveying track, wherein the carriages are provided with a cross-conveyor device oriented transversely to the transportation direction (x), comprising the steps of:
transporting items ($S_p$) on the cross-conveyor device and the items at predetermined unloading locations,
blowing off the misplaced items ($S_d$) with a blow-off device, and
identifying, with a sensor unit, a distance (d) between adjacent carriages and a misplaced item ($S_d$) located on a cover apron or a gaiter.

18. The method according to claim 17, wherein the sensor unit activates the blow-off device in the event of an identification of a misplaced item ($S_d$) located on the cover apron or the gaiter.

19. The method according to claim 17, wherein the blow-off device has a plurality of air outlet openings arranged one behind the other in the transport direction (x), wherein the air outlet opening is selectively activated, in front of which the misplaced item ($S_d$) is located to be blown off.

* * * * *

UNITED STATES PATENT AND TRADEMARK OFFICE
CERTIFICATE OF CORRECTION

| | | |
|---|---|---|
| PATENT NO. | : 11,802,008 B2 | Page 1 of 1 |
| APPLICATION NO. | : 17/415210 | |
| DATED | : October 31, 2023 | |
| INVENTOR(S) | : Hansueli Christen | |

It is certified that error appears in the above-identified patent and that said Letters Patent is hereby corrected as shown below:

In the Claims

In Claim 17, Column 10, Line 49, insert -- unloading -- before "the items at predetermined unloading locations,".

Signed and Sealed this
Thirteenth Day of February, 2024

*Katherine Kelly Vidal*

Katherine Kelly Vidal
*Director of the United States Patent and Trademark Office*